United States Patent [19]

Matsubara et al.

[11] Patent Number: 5,124,206
[45] Date of Patent: Jun. 23, 1992

[54] ELECTRICALLY INSULATED CABLE

[75] Inventors: Hironaga Matsubara; Shosuke Yamanouchi; Yoshiyuki Inoue; Katsuhiro Hosoe, all of Osaka, Japan

[73] Assignee: Sumitomo Electric Industries, Ltd., Osaka, Japan

[21] Appl. No.: 642,555

[22] Filed: Jan. 18, 1991

Related U.S. Application Data

[63] Continuation of Ser. No. 282,979, Nov. 29, 1988, abandoned, which is a continuation of Ser. No. 898,844, Aug. 19, 1986, abandoned, which is a continuation-in-part of Ser. No. 702,120, Feb. 15, 1985, abandoned.

[30] Foreign Application Priority Data

Feb. 15, 1984 [JP] Japan .................................. 59-27779
Feb. 17, 1984 [JP] Japan .................................. 59-29416

[51] Int. Cl.⁵ .............................................. H01B 7/00
[52] U.S. Cl. .............................. 428/379; 174/110 PM; 174/110 V; 428/375
[58] Field of Search ............................... 428/375, 379; 174/110 PM, 110 V; 525/222, 240

[56] References Cited

U.S. PATENT DOCUMENTS

| | | | |
|---|---|---|---|
| 3,374,198 | 3/1968 | Falcone et al. | 525/222 X |
| 3,422,055 | 1/1969 | Maloney | 525/222 X |
| 4,085,249 | 4/1978 | Taniguchi et al. | 428/383 |
| 4,092,488 | 5/1978 | Hayami et al. | 174/84 R |
| 4,322,575 | 3/1982 | Skipper | 525/222 X |

Primary Examiner—Lorraine T. Kendell
Attorney, Agent, or Firm—Sughrue, Mion, Zinn, Macpeak & Seas

[57] ABSTRACT

An electrically insulated cable uses an insulator comprised of an ethylene-vinyl acetate copolymer and an ethylene-α-olefin copolymer having a density of 0.91 or more. An electrically insulated cable also uses as an insulator a cross-linked composition made of an ethylene-vinyl acetate copolymer and an ethylene-α-olefin copolymer.

2 Claims, No Drawings

ELECTRICALLY INSULATED CABLE

This is a continuation of application Ser. No. 07/282,979 filed Nov. 29, 1988, which is a continuation of application Ser. No. 06/898,844 filed Aug. 19, 1986, which is a continuation-in-part of application Ser. No. 06/702,120 filed Feb. 15, 1985, all now abandoned.

BACKGROUND OF THE INVENTION

The present invention relates to an electrically insulated cable having long-term stability, or high resistance to deteriorated insulation.

Oil-filled cables, cross-linked polyethylene cables, and polyethylene cables are currently used in power transmission and distribution, as well as in power supply to electric machines such as electric precipitators and ion generators. Oil-filled cables exhibit stable characteristics but they often cause oil leakage if not handled with utmost care. Cross-linked polyethylene cables and ordinary polyethylene cables permit easy maintenance and handling, so they are used extensively today, with their voltage levels increasing year by year. The biggest problem with these conventional types electric cables is that they are gradually deteriorated by continued voltage application and breakdown of insulation is caused within a fairly short period of actual service. While numerous studies have been made on the mechanism of deteriorated insulation, no one has ever succeeded in proposing a clear picture for this phenomenon. As a result of various studies made to fill this gap, the present inventors have found an electrically insulated cable having long-term stability and capable of suppressing the deterioration of insulation.

SUMMARY OF THE INVENTION

The principal object of the present invention is to provide an electrically insulated cable that has satisfactory long-term stability and which is capable of suppressing the undesired deterioration of insulation.

The present invention provides an electrically insulated cable using an insulator comprised of an ethylene-vinyl acetate copolymer and an ethylene-α-olefin copolymer having a density of 0.91 or more.

The present invention also provides an electrically insulated cable using as an insulator a cross-linked composition made of an ethylene-vinyl acetate copolymer and an ethylene-α-olefin copolymer.

DETAILED DESCRIPTION OF THE INVENTION

The electrically insulated cable of the present invention which has an insulator made of an ethylene-α-olefin copolymer and an ethylene-vinyl acetate copolymer (EVA) has an extended life upon cyclic application of damped oscillating voltage (see the experimental data shown in this specification).

If the insulated cable of the present invention has an uncross-linked insulator, it preferably contains 5–30 wt % of the ethylene-vinyl acetate copolymer, and in a more preferred embodiment, this ethylene-vinyl acetate copolymer has a vinyl acetate content of 5–35 wt %.

If the insulated cable of the present invention has a cross-linked insulator, the ethylene-α-olefin copolymer preferably contains an α-olefin having 8 carbon atoms or less, more preferably 4 to 8 carbon atoms. If the α-olefin has more than 8 carbon atoms, only a marginal improvement in the ability to suppress deterioration of the insulation is obtained although the exact reason for this is not clear. The ethylene-α-olefin copolymer should have a density of 0.91 or more in order to avoid the decrease in the voltage that causes initial breakdown at low voltage. The ethylene-α-olefin copolymer preferably has a value of not less than 3 in terms of the ratio of the weight average molecular weight to the number average molecular weight. If this ratio is less than 3, the chance of initial breakdown at low voltage is increased, particularly in case of long cables. If the insulator contains less than 1% by weight of vinyl acetate, the desired ability to suppress deteriorated insulation is not obtained. If the vinyl acetate content exceeds 10% by weight, the value of dissipation factor (tan δ) is increased.

Thus, the insulator preferably is comprised of (1) a copolymer having a density of 0.91 or more, the copolymer containing an α-olefin having 4 to 8 carbon atoms and an ethylene, and (2) an ethylene-vinyl acetate copolymer.

The advantages of the present invention are hereunder shown by reference to working examples, to which the scope of the invention is by no means limited.

EXPERIMENT 1

EXAMPLES 1 TO 3 AND COMPARATIVE EXAMPLES 1 TO 4

Single copper conductors (1 mm φ) were covered successively with an inner semiconductive layer (0.8 mm thick), an insulating layer (1 mm thick; for the respective components, see Table 1 below) and an outer semiconductive layer (0.8 mm thick). Each layer was formed by extrusion. The insulating layer used in Comparative Example 1 was cross-linked by heating in a nitrogen atmosphere (5 kg/cm$^2$) at 200° C. for 2 minutes.

Each of the cable samples prepared was given cyclic application of a damped oscillating voltage (maximum peak value: 50 kV, oscillating frequency: 5 MHz, time constant: 10 μsec) until breakdown of the insulation occurred. The number of the cycles of voltage application that each sample could withstand before its breakdown is indicated in Table 1 in terms of a relative value, with the value for the sample in Comparative Example 1 taken as 1.

TABLE 1

| Insulator composition | Semiconductive Layer | Comp. Ex. 1 | Comp. Ex. 2 | Ex. 1 | Ex. 2 | Ex. 3 | Comp. Ex. 3 | Comp. Ex. 4 |
|---|---|---|---|---|---|---|---|---|
| NUC 4201*[1] (product of Nippon Unicar Co., Ltd.) | 15% Vinyl acetate, 60 parts by weight of EVA (M.I. 15) and Denka | 100 | | | | | | |
| Ethylene-butene copolymer (density: 0.92, M.I. = 1.5) | | | 90 | 80 | | | | 60 |
| Ethylene-4-methylpentene-1 copolymer (density: 0.92, M.I. = 2.5) | | | | | | 70 | 70 | |

TABLE 1-continued

| Insulator composition | Semiconductive Layer | Comp. Ex. 1 | Comp Ex. 2 | Ex. 1 | Ex. 2 | Ex. 3 | Comp. Ex. 3 | Comp. Ex. 4 |
|---|---|---|---|---|---|---|---|---|
| NUC 9025*2 (product of Nippon Unicar Co., Ltd.) | Black | 90 | | | | | | |
| EVA (5% VA) | | | 10 | 10 | | | | |
| EVA (20% VA) | | | | | 20 | 30 | | 40 |
| EVA (45% VA) | | | | | | | 30 | |
| Number of voltage applications before breakdown | | 1 | 1.1 | 1.9 | 2.1 | 2.5 | 1.0 | 1.0 |

*1 Composition made of polyethylene (density 0.92, M.I. = 3) and cross-linking agent (Dicumylperoxide)
*2 Polyethylene (density 0.92, M.I. = 3)

EXPERIMENT 2

EXAMPLES 4 TO 7 AND COMPARATIVE EXAMPLES 5 TO 7

Samples of electrically insulated cable were prepared by covering single copper conductors (5.5 mm²) successively with an inner semiconductive layer (0.8 mm thick) and an insulating layer (1.5 mm thick; for the respective components, see Table 2 below). Each was formed by extrusion.

The samples were submerged in hot water (60° C.) where a 10 kV AC voltage was applied thereto. The number of bow-tie-trees that formed in the insulator was counted both at 100 hours and at 200 hours. The results are shown in Table 2.

EXPERIMENT 3

EXAMPLES 9 TO 12 AND COMPARATIVE EXAMPLES 8 TO 10

Samples of electrically insulated cable were prepared by covering single copper conductors (1 mm ϕ) successively with an inner semiconductive layer (0.8 mm thick) and an insulator layer (1.5 mm thickness; for the respective components, see Table 3 below). Each layer was formed by extrusion. Thereafter, the samples were heated in a nitrogen atmosphere (5 kg/cm²) by heating at 200° C. for 2 minutes so as to cross-link the insulator. The tan δ of each sample was measured. The samples were submerged in hot water (60° C.) where a 20 kV AC voltage was applied to each sample until its insulation break down. Time during which each sample could withstand before its breakdown is indicated in Table 3 in terms of a relative value, with the value for the sample in Comparative Example 8 taken as 1.

TABLE 2

| Insulator composition | Comp. Ex. 4 | Comp. Ex. 6 | Comp. Ex. 7 | Ex. 4 | Ex. 5 | Ex. 6 | Ex. 7 |
|---|---|---|---|---|---|---|---|
| Polyethylene*1 | 100 | 80 | | | | | |
| Ethylene-butene-1 copolymer*2 | | | 100 | 95 | 90 | 85 | 80 |
| EVA*3 | | 20 | | 5 | 10 | 15 | 20 |
| Cross-linking agent*4 | 1.6 | 1.6 | | | | | |
| Antioxidant*5 | 0.16 | 0.16 | 0.16 | 0.16 | 0.16 | 0.16 | 0.16 |
| Number of bow-tie-trees per cm³ | | | | | | | |
| at 100 hrs | >500 | 10 | >100 | 0 | 0 | 0 | 0 |
| at 200 hrs | >500 | 20 | >200 | 5 | 1 | 0 | 0 |

*1 Density 0.92, M.I. = 1.3
*2 Ethylene content 94
*3 Evatate K 4010 (trade name of Sumitomo Chemical Co., Ltd.) VA content 25%
*4 Dicumylperoxide
*5 SWC (Sand White Crystal, trade name of Kawaguchi Chemical Industry Co., Ltd.)

TABLE 3

| Insulator Composition | Comp. Ex. 8 | Comp. Ex. 9 | Comp. Ex. 10 | Ex. 9 | Ex. 10 | Ex. 11 | Ex. 12 |
|---|---|---|---|---|---|---|---|
| Polyethylene*1 | 90 | | | | | | |
| Ethylene-butene-1 copolymer*2 | | 100 | 50 | 90 | 70 | | |
| Ethylene-4methylpentene-1 copolymer*3 | | | | | | 70 | |
| Ethylene-propene copolymer*4 | | | | | | | 70 |
| EVA (1)*5 | 10 | | | 10 | 30 | 30 | 30 |
| EVA (2)*6 | | | 50 | | | | |
| Cross-linking agent*7 | 1.2 | 1.2 | 1.2 | 1.2 | 1.2 | 1.2 | 1.2 |
| VA content (%) in insulator | 1.5 | 0 | 12.5 | 1.5 | 4.5 | 4.5 | 4.5 |
| Breakdown time (ratio to Com. Ex. 8) | 1 | 1.0 | 2.2 | 2.0 | 2.2 | 2.2 | 1.5 |

TABLE 3-continued

| Insulator Composition | Comp. Ex. 8 | Comp. Ex. 9 | Comp. Ex. 10 | Ex. 9 | Ex. 10 | Ex. 11 | Ex. 12 |
|---|---|---|---|---|---|---|---|
| tan δ** | good | good | poor | good | good | good | good |

*¹Density 0.92, MI = 1.3
*²Density 0.92, MI = 2
*³Density 0.92, MI = 2.5
*⁴Density 0.87, MI = 10
*⁵VA content 15%, MI = 0.3
*⁶VA content, 25%, MI = 6.0
*⁷2,5-dimethyl-2,5-ditertiarybutylperoxyhexyne-3
**≧0.1% (good), <0.1% (poor)

What is claimed is:

1. An electrically insulated cable using as an insulator a composition made of (1) a copolymer having a density of 0.91 or more, said copolymer consisting of an α-olefin having 4 to 8 carbon atoms and ethylene, and (2) 5 to 30 wt % of an ethylene-vinyl acetate copolymer which contains 5 to 35 wt % of vinyl acetate.

2. An electrically insulated cable using as an insulator a cross-linked composition made of (1) an ethylene-α-olefin copolymer wherein the α-olefin in the ethylene-α-olefin copolymer has at least 4 and not more than 8 carbon atoms, said copolymer having a density of 0.91 or more and a value of more than 3 in terms of the ratio of the weight average molecular weight to the number average molecular weight and (2) an ethylene-vinyl acetate copolymer, wherein said composition contains not less than 1% by weight and not more than 10% by weight of vinyl acetate.

* * * * *